June 23, 1959  A. SIANO ET AL  2,891,818
EMERGENCY AUXILIARY BRAKING SYSTEM
Filed Feb. 27, 1956

ALFRED SIANO
EDWARD W. FINN
ARTHUR H. VAN HOUTEN
INVENTORS

BY Daniel H. Bobis
atty

United States Patent Office 2,891,818
Patented June 23, 1959

2,891,818

EMERGENCY AUXILIARY BRAKING SYSTEM

Alfred Siano, Newark, Edward W. Finn, Hackensack, and Arthur H. Van Houten, Hasbrouck Heights, N.J.

Application February 27, 1956, Serial No. 568,027

4 Claims. (Cl. 303—63)

This invention relates generally to braking systems for motor vehicles and more particularly to an auxiliary braking system adapted for emergency operation in the event that the main braking system on the motor vehicle arrangement should fail.

Because of the failure of the conventional air braking systems, now in use on large tractor-trailer truck combinations, many serious accidents have occurred, costing untold damage to property and unnecessary loss of life.

There have been prior attempts to provide emergency systems to acting in conjunction with these main air braking systems, both for motor and rail vehicles. However, these have failed because they have been tied into the main air braking systems in such a way that where a line or brake actuating mechanism ruptured, both the main and the emergency systems vented to atmosphere and the emergency system failed to provide the desired protection.

The present invention seeks to overcome this problem by providing independent, self-contained emergency units for each of the braking members in the braking system which independent, self-contained emergency units are capable of being controlled electrically from the cab of the tractor and which can either be applied all at once or in successive stages to effectively stop the tractor and the trailer without developing inherent dangers, such as jackknifing, etc., which have occurred in the past.

Accordingly, it is an object of the present invention to provide an emergency auxiliary braking system comprising a series of independent units, one for each of the braking members which do not require a secondary air line system and are electrically controlled through a manually or automatically operated switch mechanism.

It is another object of the present invention to provide an independent emergency auxiliary braking unit for application to each of the braking members which is adaptable to either the old or the new type of air braking systems.

It is another and further object of the present invention to provide cooperative relation of the independent emergency auxiliary braking units through the switch mechanism so that the units are adapted to be actuated independently or in groups or all at once as is most desirable to effectively adapt the emergency unit to perform its function.

It is a still further object of the present invention to provide in each of the independent emergency auxiliary braking units a simple mechanism whereby a braking mechanism may be blocked out of the general system, such as where rupture of the actuating member for this braking mechanism has occurred so that the main air braking system can continue to operate.

Further objects and advantages of the invention will become evident from the following description with reference to the accompanying drawings in which.

Figure 1:
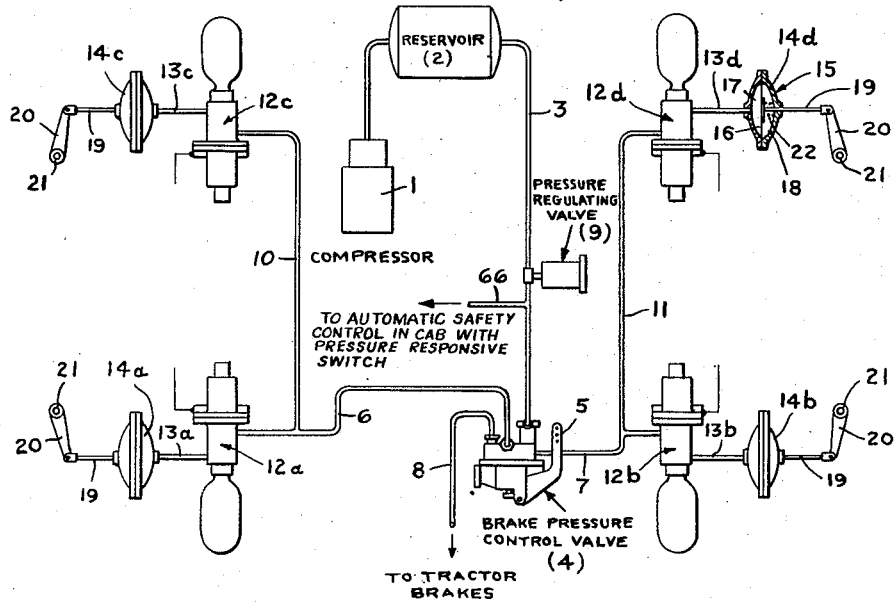
Figure 1 shows a diagrammatic sketch showing the trailer portion of the main air braking system with a preferred form of the present invention applied thereto.

Referring more particularly to the drawings, Figure 1 shows diagrammatically the trailer portion of the main air braking system of a tractor-trailer type motor vehicle including a compressor 1 which may be driven by any suitable means, for example, off the prime mover, not shown, for driving the tractor-trailer.

The compressor 1 discharges pressure air to a reservoir 2 in turn connected through main discharge line 3 to a brake pressure control valve 4 operated by the conventional foot lever now in use on such vehicles which is connected through suitable linkage to the operating arm 5. When pressure is exerted on the foot lever to move the operating arm 5 pressure air will be delivered to the connecting lines 6, 7, and 8. A suitable pressure regulating valve 9 is provided in the main discharge line to adjust the pressure at which the air will be delivered to the respective connecting lines 6, 7, and 8.

The connecting lines 6 and 7 communicate directly with the emergency auxiliary control units 12a and 12b related to the braking members at the front end of the trailer and lines 10 and 11, connected respectively to lines 6 and 7, communicate with the emergency control units 12c and 12d related to the braking members of the rear end of the trailer. The braking members are not shown as they are well known to those skilled in the art.

The emergency auxiliary control units 12a, 12b, 12c, and 12d, each in turn communicate through a suitable means or lines as at 13a, 13b, 13c, and 13d to the respective brake actuating motors 14a, 14b, 14c, and 14d for the brake members not shown.

The brake actuating motors 13 are identical, hence, only one of these motors 14a is illustrated in section Figure 1. Thus, the brake actuating motors include a casing 15 having a diaphragm 16 transversely disposed therein to form an inner chamber 17 and an outer chamber 18. The inner chamber 17 in each of the brake actuating motors receives pressure air through the respective connecting conduits 13a, 13b, 13c and 13d. Connected to the diaphragm on the side opposite from the inner chamber is an elongated rod 19 which extends through the outer chamber to a lever arm 20 connected to the opening shaft 21 of the braking member itself. A spring 22 disposed in the outer chamber 18 about the operating rod and between the casing forming the outer chamber at one side of the diaphragm member will urge the diaphragm and hence the elongated rod and lever to normally hold the brake member in a non-braking position. This type brake actuating motor is illustrated in simplified form for the purposes of the present invention. Devices of this type are well known in the art; hence, they are not more fully described herein.

The emergency auxiliary control units 12a, 12b, 12c and 12d, as is hereinafter described will normally allow air to pass from lines 6, 7, 10 and 11 to lines 13a, 13b, 13c, and 13d. Thus, when the brake pressure control valve 4 is opened pressure air will move freely through the respective connecting lines to the brake actuating motors 14a, 14b, 14c and 14d to act in the inner chambers 17 thereof to overcome atmospheric pressure in the outer chamber 18 and the action of the spring member 22 and thus will urge the elongated rods 19 and lever member 20 so that the operating shafts 21 of the braking members will actuate the brakes to a braking position. This type system with the exception of the emergency auxiliary control units 12a, 12b, 12c, and 12d, are well known to those skilled in the art.

Emergency auxiliary control unit

Since each of the emergency auxiliary control units are identical in construction, an enlarged view of only one of these units, 12d, is shown in Figure 4, and described.

Figure 2:
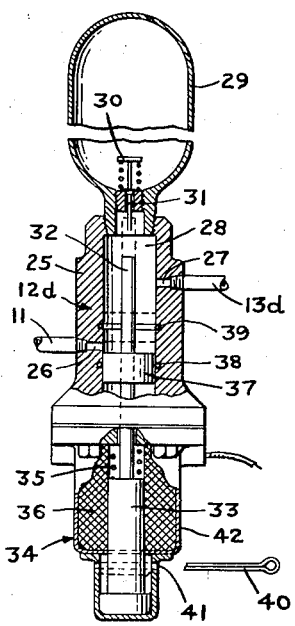
Figure 2 is an enlarged view partly in section of one of the emergency auxiliary control units forming a part of the present invention.

Thus referring to Figure 2, the emergency control unit is shown as including a valve housing generally designated 25 having an inlet 26 and an outlet 27 spaced at remote ends of the valve chamber 28 formed by the valve housing.

The main air line connections 6, 7, 10, and 11, will connect to the inlet opening 26 on each of the emergency control units and the outlets will similarly be connected to the respective connecting conduits 13a, 13b, 13c, and 13d.

Mounted in any suitable manner at one end of the valve housing 25 is an independent reservoir 29 of pressure fluid having a normally closed valve 30, for example, of the Schrader type, which can be opened by moving the valve stem 31 inwardly to allow pressure air to flow therefrom into the valve chamber 28. The valve stem 31 of the valve is disposed in the axial line of the valve chamber and communicates therewith so that movement of the end of an elongated rod 32 into contact therewith will open the valve.

The elongated rod forms an extension of the iron core 33 of an electrically operated solenoid 34. A spring element 35 acts to hold the iron core and elongated rod out of engagement with the valve stem 31 until the solenoid coil 36 is actuated as is hereinafter described.

Figure 2 further shows an annular piston 37 formed on the elongated rod and movable therewith which is slidably disposed relative to the valve chamber 28 formed by the valve housing. Suitable O type seals as at 38 and 39 will be provided to prevent leakage of air when the piston is moved to the respective positions as indicated by the solid and phantomized lines in the figure.

The piston is normally disposed in the valve chamber to allow fluid to flow freely from the inlet 26 to the outlet 28. However, when the solenoid coil 36 is actuated the piston member moves with the elongated rod to block off the inlet 26. Since the elongated rod 32 will also move to contact the valve stem 31 of the valve member 30 pressure air will be delivered through the valve 30 into the valve chamber 28 and will pass through the outlet 27 and the connecting lines 13a, 13b, 13c, and 13d, to the brake actuating motors 14a, 14b, 14c and 14d of the respective brake mechanism to which it is connected.

Figure 2 further shows that when the solenoid coil 36 is energized the end of the iron core 33 will be moved so as to allow a pin 40 or any other suitable mechanism to be placed transversely of the end thereof as through the opening 41 in the casing 42 of the solenoid 34 so that on deenergization the core 33 will be locked to maintain the main lines 6, 7, 10, and 11 out of communication with the particular braking mechanism associated with the particular emergency control unit.

Electrical control circuit

Figure 3:
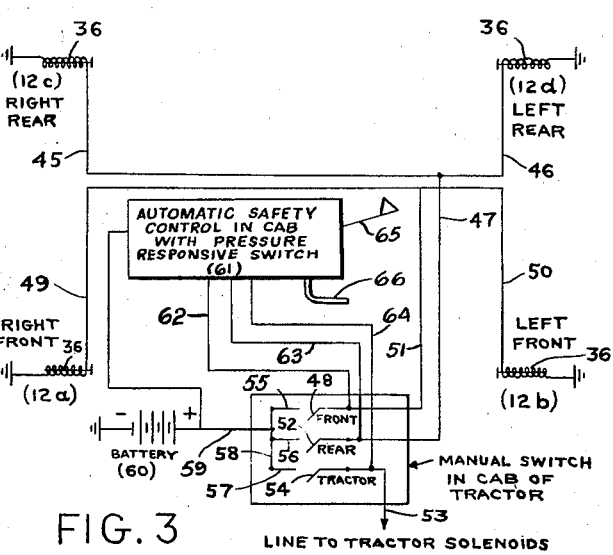
Figure 3 is a circuit diagram showing the means for controlling the emergency auxiliary control units.

One form of electrical circuit for actuating the solenoid coils 36 of the respective solenoids 34 on the emergency auxiliary control units 12a, 12b, 12c, and 12d is shown in Figure 3.

In this circuit the coils 36 leading to the respective right and left rear braking members of the trailer portion of the vehicle are connected through electrical lines 45 and 46 to a common line 47. Line 47 connects to one side of a first toggle or the like type of switch 52. Similarly, the coils 36 for the right and left front braking members of the trailer are connected through electrical lines 49 and 50 to the common line 51, in turn connected to one portion of a second toggle switch 48 and the braking units for the tractor are connected through their common line 53 to one side of a third toggle switch 54.

The toggle switches may be of any type of which there are many easily purchasable on the open market and generally will be of the type such as is used on aircrafts which are held normally open by a spring member and must be moved to a closed position. When the portions 48, 52, and 54 of the toggle switch are moved to contact the respective stationary portions 55, 56, and 57 connected to a common bus 58 receiving current through line 59 from battery 60 current will flow from the battery 60 to the coils 36 since the battery and coils are grounded in the conventional manner to complete the circuit. The actuation of the coils will cause the iron cores 33 of the solenoids 34 to move inwardly towards the valve chamber 28 so that the operation as above described will occur.

The switches are located in the cab of the tractor, hence, it is believed clear that the driver of the truck can easily actuate one or all of the switches or alternately actuate the switches in whatever order he chooses to place the units into operation. It will be understood that while paired combinations are shown, as this is preferred from a safety angle to provide more uniform braking, that individual switches could be provided for each of the units and the driver of the vehicle could similarly operate one or more either alone or in combination as desired.

In order to render the present device automatic the emergency signaler generally designated 61 may be utilized as shown in Figure 3. Such signalers of course form part of the present equipment now existing on trucks and, hence, are not more fully described or shown on the present application.

In the use of the signaler the switches are connected by means of separate lines 62, 63, and 64 to the emergency signaler arm generally designated 65 and when the pressure air delivered to the emergency signaler through the air line 66 falls below a predetermined pressure limit the air will cause the arm 65 to swing across the windshield in the manner well known in the art.

By connecting line 67 to the battery 60 when contact is made with the contacting means not shown for lines 62, 63 and 64, the current will be passed to the respective coils 36 of the solenoids and the emergency auxiliary control units 12a, 12b, 12c, and 12d will be energized to provide braking actions on all the braking mechanisms in the manner above described.

It has been found that if the independent emergency auxiliary pressure air tanks 29 contain air at approximately 500 p.s.i.g. they will stop a truck moving at 30 m.p.h. with a gross load of approximately 61,000 lbs. in 60 feet. Further, it has been found that at this pressure the braking action can be applied at least two or three times before the pressure is lost.

Refilling of the pressure vessels 29 is also relatively simple as they can be unscrewed and connected to any conventional compressor system and by reason of the simple Schrader type valve can be refilled without any complicated or special apparatus.

It will be understood that the invention is not to be limited to the specific construction or arrangement of parts shown but that they may be widely modified within the invention defined by the claims.

What is claimed is:

1. The combination with the main air braking system of a vehicle including a brake actuating motor operated by pressure air, and a line for delivering pressure air to said brake actuating motor of an independent auxiliary control unit including, a valve housing connected between said line and said brake actuating motor, a valve chamber in said valve housing having an inlet communicating with said pressure air line and an outlet communicating with the brake actuating motor, an independent reservoir of pressure air having its outlet directly connected to said valve chamber, a first normally closed valve means in said reservoir outlet arranged to open said reservoir outlet to pass pressure air from said reservoir to said chamber, a second normally open valve means in the valve chamber disposed to allow pressure air from said pressure air line to pass from valve housing inlet to the valve housing outlet and also disposed so that the valve housing outlet is always open, means connected to said second valve means for actuating said first valve means to an open position upon closing of said valve housing inlet by said second valve, an electrically actuated means connected to said valve housing and having an element extending into said valve chamber, said second valve being connected to said element to be moved on actuation of said element to close off the inlet and open said first valve to provide communication between the independent reservoir and said valve chamber outlet.

2. In the combination as claimed in claim 1 including latching means to hold said second valve in a position to close off said inlet to the valve chamber after said electrically actuated element has been actuated during emergency conditions.

3. In the combination as claimed in claim 1 including control means responsive to pressure failure in said main braking system, and means operatively connecting said control means to the electrically actuated means to actuate said electrically actuated means when pressure failure occurs in said main braking system.

4. The combination with the main air braking system of a vehicle including a brake actuating motor operated by pressure air, and a line for delivering pressure air to said brake actuating motor of an independent auxiliary control unit including, a valve housing connected between said line and said brake actuating motor, a valve chamber in said valve housing having an inlet communicating with said pressure air line and an outlet communicating with the brake actuating motor, an independent reservoir of pressure air having its outlet directly connected to one end of said valve housing to communicate with said valve chamber, a first normally closed valve means in said reservoir outlet arranged to open said reservoir outlet to pass pressure air from said reservoir to said chamber, a second normally open valve means in the valve chamber disposed to allow pressure air from said pressure air line to pass from the valve housing inlet to the valve housing outlet and also disposed so that the valve housing outlet is always open, extension means on said second valve of predetermined length adapted to contact and open said first valve on movement of said second valve to close said valve housing inlet, an electrically actuated means connected to said valve housing remote from the end connected to said independent reservoir of pressure air and having an element extending into said valve chamber, said second valve being connected to said element to be moved on actuation of said element to close off the inlet and open said first valve to provide communication between the independent reservoir and said valve chamber outlet.

References Cited in the file of this patent

UNITED STATES PATENTS

| 2,670,817 | Tripp | Mar. 2, 1954 |
| 2,674,852 | Olman | Apr. 13, 1954 |
| 2,680,500 | Jenkins | June 8, 1954 |
| 2,759,569 | Keehn | Aug. 21, 1956 |
| 2,781,870 | Clements | Feb. 19, 1957 |

FOREIGN PATENTS

| 537,977 | Germany | Nov. 31, 1931 |